United States Patent
Wolf-Molnar et al.

(10) Patent No.: US 11,617,977 B2
(45) Date of Patent: Apr. 4, 2023

(54) PARTICLE SEPARATOR NOZZLES AND METHODS

(71) Applicant: SONUS Engineered Solutions, Warren, MI (US)

(72) Inventors: Pal Marton Wolf-Molnar, Grosse Pointe Woods, MI (US); Tim Droege, Macomb, MI (US)

(73) Assignee: Sonus Engineered Solutions, Warren, MI (US)

( * ) Notice: Subject to any disclaimer, the term of this patent is extended or adjusted under 35 U.S.C. 154(b) by 59 days.

(21) Appl. No.: 17/167,439

(22) Filed: Feb. 4, 2021

(65) Prior Publication Data

US 2021/0236975 A1 Aug. 5, 2021

Related U.S. Application Data

(60) Provisional application No. 62/969,717, filed on Feb. 4, 2020.

(51) Int. Cl.
*B01D 45/16* (2006.01)
*B01D 46/00* (2022.01)

(52) U.S. Cl.
CPC ......... *B01D 45/16* (2013.01); *B01D 46/0039* (2013.01); *B01D 46/0002* (2013.01)

(58) Field of Classification Search
CPC .... B01D 45/16; B01D 45/18; B01D 46/0039; B01D 46/0002
See application file for complete search history.

(56) References Cited

U.S. PATENT DOCUMENTS

| | | | | |
|---|---|---|---|---|
| 3,807,562 A | * | 4/1974 | Goda | F16K 15/147 210/136 |
| 4,735,640 A | * | 4/1988 | Thornburgh | B01D 46/24 55/315 |
| 6,921,424 B2 | * | 7/2005 | Bugli | B01D 45/16 55/412 |
| 2005/0268582 A1 | * | 12/2005 | Su | B01D 46/0031 55/385.3 |
| 2005/0284118 A1 | * | 12/2005 | Nishiyama | B01D 46/88 55/498 |
| 2007/0234903 A1 | * | 10/2007 | Xu | F02M 35/022 95/267 |
| 2009/0050105 A1 | * | 2/2009 | Shibata | F02M 35/022 123/306 |
| 2009/0301949 A1 | * | 12/2009 | Kolczyk | B01D 35/153 123/198 R |

(Continued)

FOREIGN PATENT DOCUMENTS

| | | | | |
|---|---|---|---|---|
| CN | 101232927 A | * | 7/2008 | .......... B01D 27/101 |
| CN | 108554015 A | * | 9/2018 | |

(Continued)

*Primary Examiner* — Hung Q Nguyen
(74) *Attorney, Agent, or Firm* — Carlson, Gaskey & Olds, P.C.

(57) ABSTRACT

A particle separator nozzle valve includes a connection portion, which provides at least one tapered inner surface. A tapered portion extends from the connection portion. The tapered portion includes a tapered inner surface and a tapered outer surface. A first protrusion extends from the inner surface and a second protrusion extends from the outer surface. A lip portion extends from the tapered portion.

20 Claims, 4 Drawing Sheets

(56) References Cited

U.S. PATENT DOCUMENTS

| | | | |
|---|---|---|---|
| 2013/0212989 A1* | 8/2013 | da Silva | F02M 35/024 55/315 |
| 2014/0033921 A1* | 2/2014 | Peck | B01D 46/0086 55/464 |
| 2016/0059172 A1* | 3/2016 | Allott | B01D 46/0005 55/502 |
| 2016/0375391 A1* | 12/2016 | Adamek | B01D 46/64 55/493 |
| 2022/0241711 A1* | 8/2022 | Wyatt | F02M 35/0201 |

FOREIGN PATENT DOCUMENTS

| | | | | |
|---|---|---|---|---|
| CN | 109356562 A | * | 2/2019 | B01D 36/04 |
| CN | 111615420 A | * | 9/2020 | B01D 46/0005 |
| EP | 1619380 A1 | * | 1/2006 | B01D 46/0031 |
| EP | 1754525 A1 | * | 2/2007 | B01D 46/0001 |
| FR | 2296454 A | * | 9/1976 | B01D 27/103 |
| JP | 2504211 B2 | * | 6/1996 | B01D 36/04 |
| JP | 2005330826 A | * | 12/2005 | |
| JP | 2006037947 A | * | 2/2006 | |
| JP | 2006274947 A | * | 10/2006 | |
| JP | 2009504984 A | * | 2/2009 | B01D 46/0005 |
| JP | 4455382 B2 | * | 4/2010 | |
| JP | 2015175242 A | * | 10/2015 | |
| JP | 6206264 B2 | * | 10/2017 | |
| RU | 177581 U1 | * | 3/2018 | B01D 45/00 |
| WO | WO-2009117579 A1 | * | 9/2009 | B01D 46/0068 |
| WO | WO-2014210534 A1 | * | 12/2014 | B01D 45/12 |

* cited by examiner

PARTICLE SEPARATOR NOZZLES AND METHODS

CROSS-REFERENCE TO RELATED APPLICATION

This application claims priority to U.S. Provisional Application No. 62/969,717, which was filed on Feb. 4, 2020.

BACKGROUND

Vehicles, such as automobiles, heavy trucks, agricultural vehicles, commercial vehicles, as well as water and air vehicles, include air intake systems for providing air flow to their engines.

SUMMARY

A particle separator nozzle valve according to an example of this disclosure includes a connection portion, which provides at least one tapered inner surface. A tapered portion extends from the connection portion. The tapered portion includes a tapered inner surface and a tapered outer surface. A first protrusion extends from the inner surface and a second protrusion extends from the outer surface. A lip portion extends from the tapered portion.

In a further example of the foregoing, the connection portion includes a plurality of segments, each providing a tapered inner connection portion surface.

In a further example of any of the foregoing, each of the plurality of segments provides a gap between and adjacent of the plurality of segments.

In a further example of any of the foregoing, the plurality of segments includes four segments.

In a further example of any of the foregoing, the lip portion includes two opposing lips, which extend from the tapered portion.

In a further example of any of the foregoing, the tapered portion includes a third protrusion, which extends from a second inner surface opposite the first inner surface.

In a further example of any of the foregoing, the tapered portion includes a fourth protrusion, which extends from a second outer surface opposite the outer surface.

In a further example of any of the foregoing, the nozzle valve is a monolithic injection molded component.

A particle separator nozzle valve according to an example of this disclosure includes a connection portion, which provides at least one tapered inner surface. The connection portion is substantially square in cross section. A tapered portion extends from the connection portion. The tapered portion includes a tapered inner surface and a tapered outer surface. A first protrusion extends from the inner surface and a second protrusion extends from the outer surface. A lip portion extends from the tapered portion. A portion of the tapered outer surface is provided between the second protrusion and the lip portion.

In a further example of the foregoing, the nozzle valve is a monolithic injection molded component.

In a further example of any of the foregoing, the connection portion includes a plurality of segments, each providing a tapered inner connection portion surface.

In a further example of any of the foregoing, each of the plurality of segments provides a gap between and adjacent of the plurality of segments.

In a further example of any of the foregoing, the plurality of segments includes four segments.

In a further example of any of the foregoing, the lip portion includes two opposing lips, which extend from the tapered portion.

In a further example of any of the foregoing, the tapered portion includes a third protrusion, which extends from a second inner surface opposite the first inner surface.

In a further example of any of the foregoing, the tapered portion includes fourth protrusion, which extends from a second outer surface opposite the outer surface.

A method according to an example of this disclosure includes an injection molding and a monolithic nozzle valve. The nozzle valve includes a connection portion, which provides at least one tapered inner surface. A tapered portion extends from the connection portion. The tapered portion includes a tapered inner surface and a tapered outer surface. A first protrusion extends from the inner surface and a second protrusion extends from the outer surface. A lip portion extends from the tapered portion.

These and other features may be best understood from the following specification and drawings, the following of which is a brief description.

DETAILED DESCRIPTION

This disclosure relates generally to particle separator systems and methods for providing air flow to vehicle engines. In some examples, the particles may include sand, dust, or other like solid or liquid particles.

Figure 1:
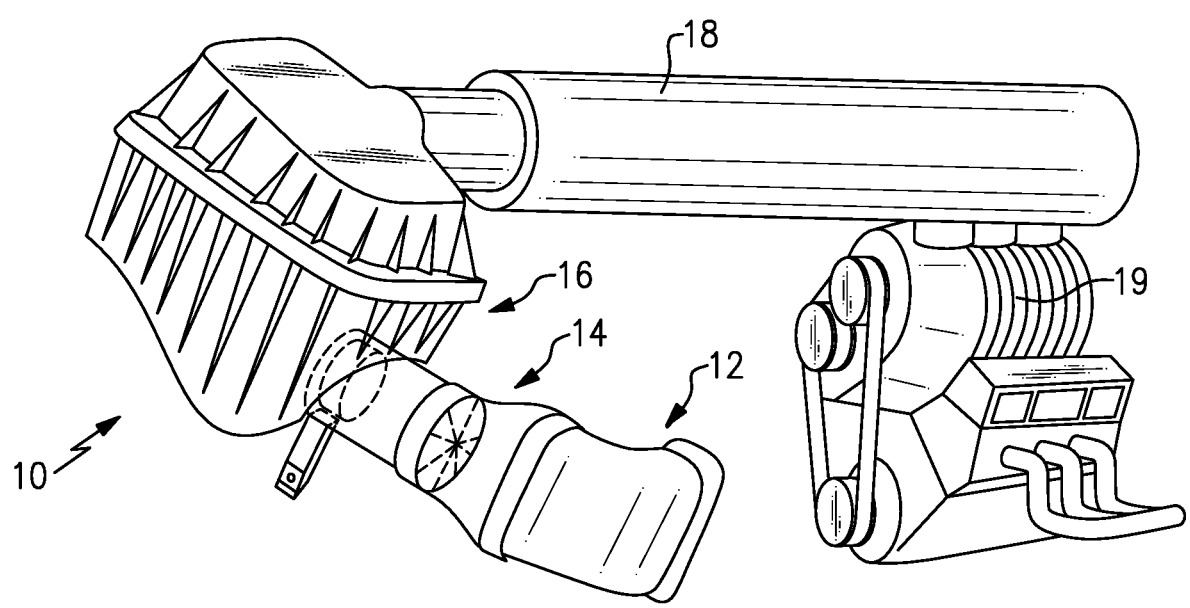
FIG. 1 illustrates an example air intake system.

FIG. 1 illustrates an example air intake system 10 for a vehicle. The vehicle may include any of automobiles, heavy trucks, agricultural vehicles, commercial vehicles, as well as water and air vehicles, in some examples. In the example shown, air flows through a snorkel assembly 12, through a particle separator assembly 14, through a filter assembly 16, to the clean side duct 18 and ultimately to the vehicle engine 19 (shown schematically). Although an illustrative example is shown in FIG. 1, a person of ordinary skill in the art would recognize that other air intake assemblies may benefit from this disclosure.

Figure 2:
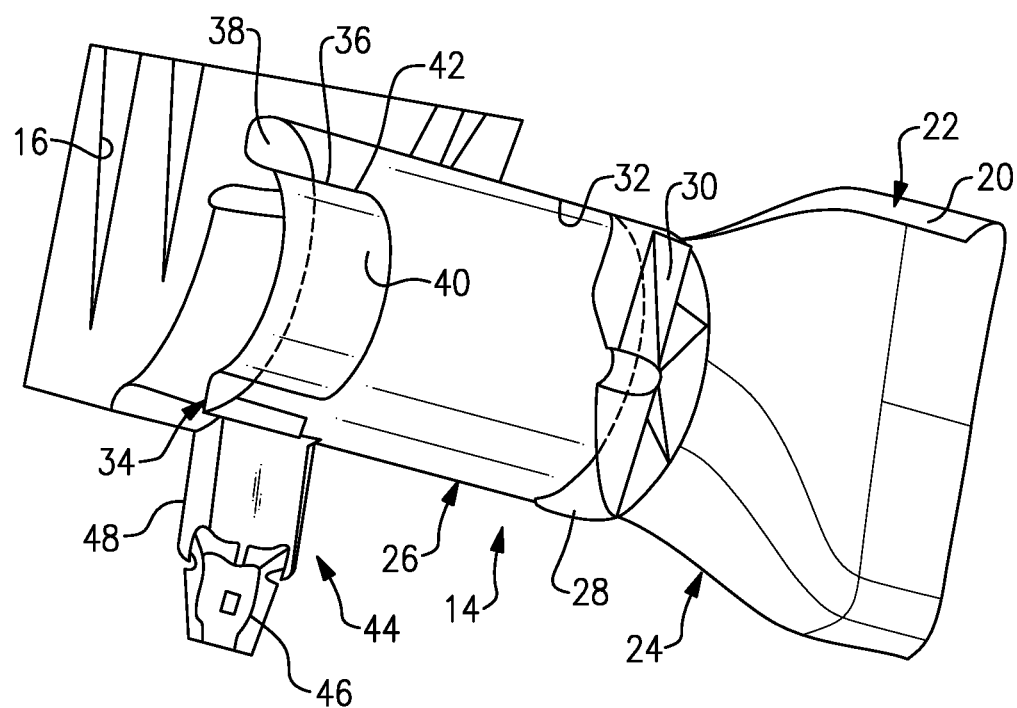
FIG. 2 illustrates an example particle separator system.

FIG. 2 illustrates an internal view of the example particle separator assembly 14 for preventing particles, including sand, dust, or other like solid or liquid particles, from flowing toward the clean side duct 18 (see FIG. 1). The assembly 14 includes an intermediate duct 20, providing an upstream portion 22, a transition portion 24, and a downstream portion 26. In some examples, as shown, the transition portion 24 transitions the intermediate duct 20 from a non-circular cross section to a circular cross section. In some examples, as shown, the upstream portion 22 has a greater cross-sectional area than the downstream portion 26.

An example spinner assembly 28 includes a plurality of stators 30 within the intermediate duct 20. The stators 30 may be oriented to direct particles outward toward the inner surface 32 of the intermediate duct 20. The stators 30 cause the air to rotate, which increases the local air velocity and causes any heavier particle to verge or migrate outwards, known as the hydrocyclone effect.

An example trap tube 34 may be provided at a downstream end of the intermediate duct and includes a cylindrical portion 36 and an outer flange 38 extending radially outward from the cylindrical portion 36. The flange 38 may be received against or adjoined to the surface 32 for sealing. The cylindrical portion 36 provides a radially inner surface 40 and a radially outer surface 42. The trap tube 34 is configured such that clean air flows along the radially inner surface 40 into the filter assembly 16, and particles are directed radially outward of the cylindrical portion and down into a reservoir portion 44. The reservoir portion 44 may be positioned according to the normal orientation of the rest of the assembly such that gravity causes the particles to fall into the reservoir portion 44.

The reservoir portion 44 includes an example particle separator nozzle valve 46 that may be received partially within a reservoir passageway 48. As explained further below, the nozzle valve 46 is designed to remain closed when the engine is on and/or at high speed (rpm), but may be opened when the engine is off and/or in idle to remove particles from the reservoir assembly 44.

Figure 3:
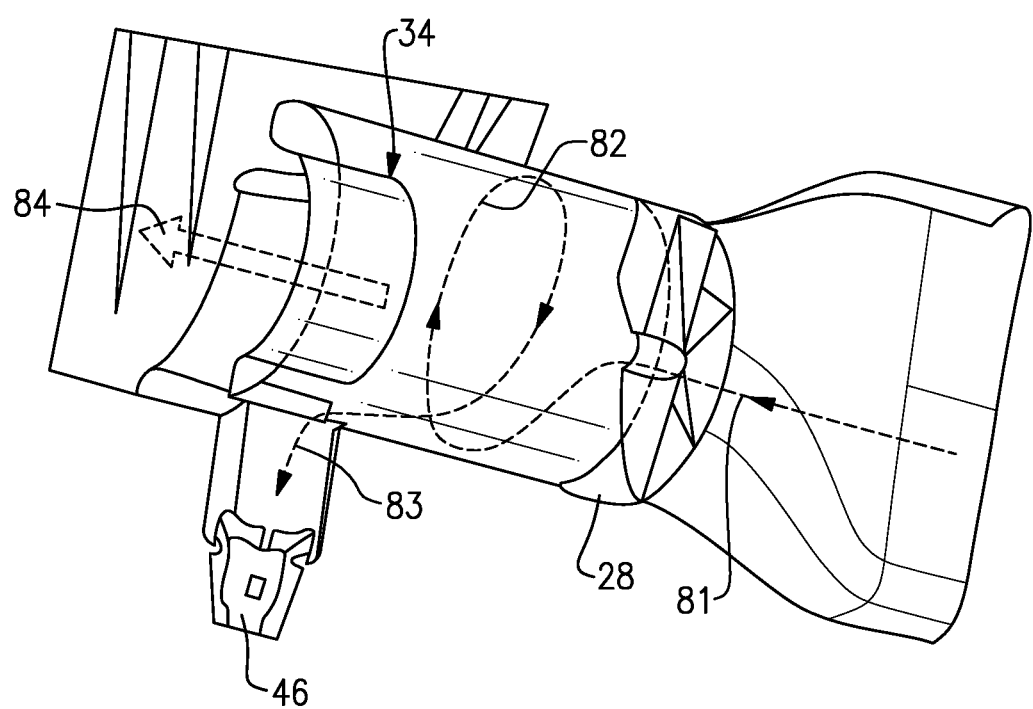
FIG. 3 schematically illustrates a flow path through the example particle separator system shown in FIG. 2.

FIG. 3 schematically illustrates an example flow through the particle separator assembly 14. The fresh air, mixed with some heavier particles (like sand, dust, or other like solid or liquid particles) enters the particle separator along the flow path 81. Passing through the spinner 28 forces the mixture to rotate along flow path 82, thus any heavier particles to verge or migrate outboards. Passing through the trap tube 34, the outer layers with high particle content are directed along flow path 83 towards the nozzle valve 46, while the inner layers with low particle content follow the flow path 84 through the middle of the trap tube 34 towards a filter assembly and ultimately towards an engine (see FIGS. 1 and 2).

Figure 4C:
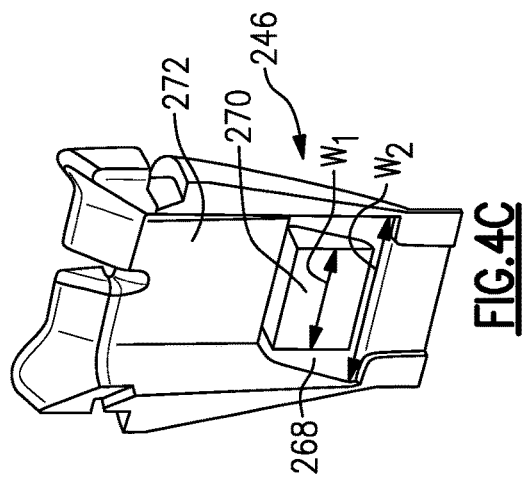
FIG. 4C illustrates another partial view of the example particle separator nozzle valve of FIGS. 4A-4B.
Figure 4B:
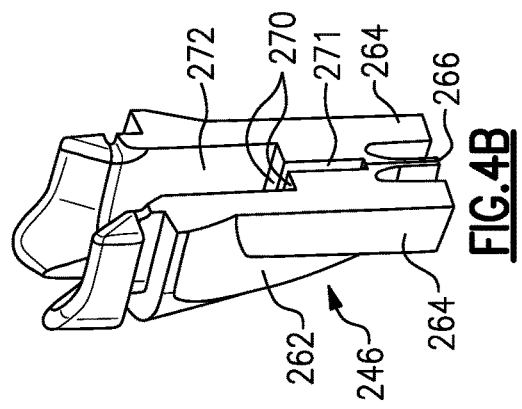
FIG. 4B illustrates a partial view of the example particle separator nozzle valve of FIG. 4A.
Figure 4A:
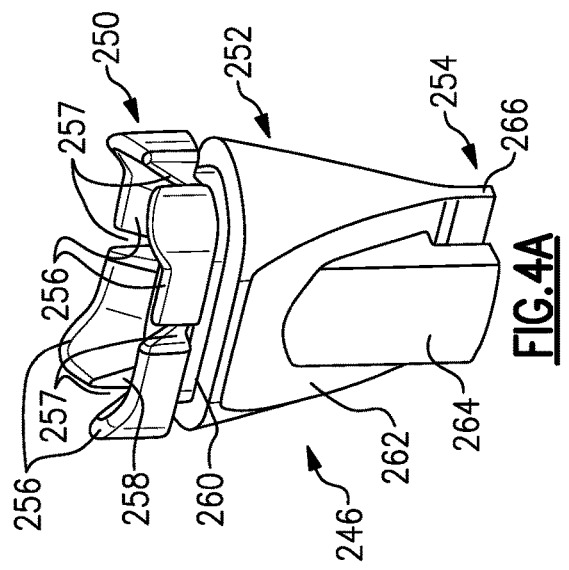
FIG. 4A illustrates an example particle separator nozzle valve.

FIGS. 4A-4C illustrate an example nozzle valve 246. It should be understood that like reference numerals identify corresponding or similar elements throughout the several drawings. The nozzle valves disclosed herein may be utilized with the disclosed particle separator assembly 14 or similar particle separator assemblies in some examples. In some examples, other assemblies may benefit from the disclosed nozzle valves as well.

As illustrated in FIG. 4A, the example nozzle valve 246 includes a connection portion 250, a tapered portion 252, and a lip portion 254. In some examples, the connection portion 250 is designed to connect in a sealing manner to a particle separator system, such as the system 14 shown in FIG. 2, and more particularly the reservoir passageway 48 in some examples. The connection portion 250 may include multiple segments 256, such as four segments 256 in some examples, as shown. More or fewer segments 256 may be utilized. The segments 256 provide gaps 257 therebetween that may allow the connection portion to be pinched for insertion into a passageway. The connection portion 250 may provide one or more tapered inner surfaces 258 to facilitate downward movement of the particles within the nozzle valve 246.

The example tapered portion 252 extends from the connection portion 250 at a ridge 260 provided by the connection portion 250. The ridge 260 may provide for sealed attachment with a passageway, such as the passageway 48 shown in FIG. 2 in some examples. The tapered portion 252 includes one or more tapered outer surfaces 262. In some examples, as shown, two opposing tapered outer surfaces 262 are provided. A protrusion 264 may extend from the tapered outer surface 262. The lip portion 254 may include two opposing lips 266 extending from the tapered portion 252. The lips 266 may remain closed when the engine is on, but may be opened when the engine is off and/or in idle for removal of particles.

As shown in FIG. 4B, in some examples, two opposing protrusions 264 may extend from the two opposing tapered outer surfaces 262. In some examples, as shown, the protrusions 264 may extend downward (with respect to the orientation shown in the Figure) to be even with the lips 266. In some examples the protrusions 264 may extend downward to be anywhere from even with the lips 266 to 0.25 in above the lips 266.

As shown in FIG. 4C, the tapered portion 252 includes a protrusion 270 extending from the tapered inner surface 268. In some examples, as shown, the protrusion 270 has a width $w_1$ less than the width $w_2$ of the tapered surface 268 to allow particles to fall along the tapered surface toward the lip portion 254. With reference back to FIG. 5B, the tapered portion 252 may include opposing tapered surfaces 268 each having a protrusion 270 extending therefrom. A gap 271 may be provided between the opposing protrusions 270 as shown to allow particles to fall between the protrusions 270 and to the lips 266. In some examples, as shown, the tapered portion 252 may include one or more non-tapered inner surfaces 272 extending from the connection portion 250 to the tapered inner surface 268. In some examples, as shown, the protrusion 270 forms a triangular prism, such as a right triangular prism with the hypotenuse of the triangular cross section of the triangular prism adjoining the tapered inner surface 268.

The protrusions 264, 270 may be made of an injection molded rubber in some examples, such that the nozzle valve 246 is a monolithic injection molded rubber component. In some examples, the protrusions may include bellows provided by a wrinkle-like geometry (not shown). The protrusions 264, 270 may assist in the opening of the nozzle valve 246 for removal of particles.

Figure 5C:
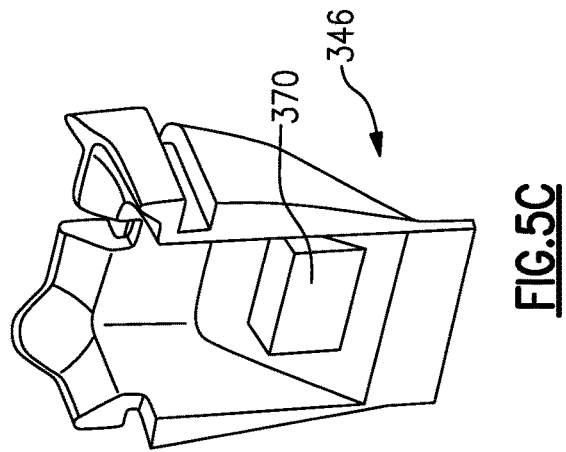
FIG. 5C illustrates another partial view of the example particle separator nozzle valve of FIGS. 5A-5B.
Figure 5B:
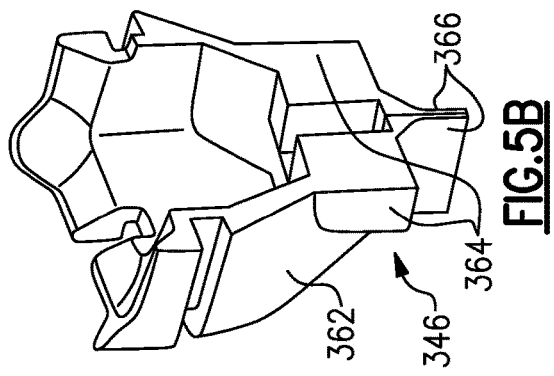
FIG. 5B illustrates a partial view of the example particle separator nozzle valve of FIG. 5A.
Figure 5A:
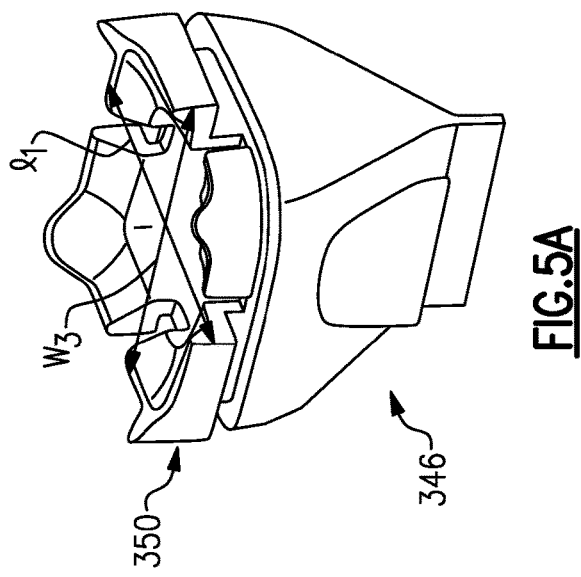
FIG. 5A illustrates another example particle separator nozzle valve.

FIGS. 5A-5C illustrate an example particle separator nozzle valve 346 substantially similar to the nozzle valve 246 shown in FIGS. 4A-4C. However, as shown in FIG. 5A, the connector portion 350 is substantially square in cross section, such that the length $l_1$ of the connector portion 350 is +/−10% of the width $w_3$ of the connector portion 350. As shown in FIG. 5B, the protrusions 364 do not extend downward (with respect to the orientation shown in the Figure) to the lips 366. In some examples, as shown a portion of the tapered surface 362 is provided between the respective protrusion 364 and lip 366. As shown in FIG. 5C, inner protrusions 370 are provided.

A method according to any example of this disclosure may include injection molding a monolithic nozzle valve. The nozzle valve may be said to include a connection portion providing at least one tapered inner surface and a tapered portion extending from the connection portion. The tapered portion may include a tapered inner surface and a tapered outer surface. A first protrusion may extend from the inner surface and a second protrusion may extend from the outer surface. A lip portion may extend from the tapered portion.

In one or more of the disclosed examples, the protrusions may eliminate the need for additional components, such as metal weights, for opening the nozzle valves. The protrusions may be provided as part of a monolithic injection molded part, increasing manufacturing and assembly efficiency.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A particle separator nozzle valve, comprising:
   a connection portion including at least four segments, each segment providing a tapered inner connection portion surface;
   a tapered portion extending from the connection portion, wherein the tapered portion includes a tapered inner surface and a tapered outer surface, and a first protrusion extends from the tapered inner surface of the tapered portion and a second protrusion extends from the tapered outer surface of the tapered portion; and
   a lip portion extending from the tapered portion.

2. The nozzle valve as recited in claim 1, wherein each of the at least four segments provides a gap between an adjacent of the at least four segments.

3. The nozzle valve as recited in claim 1, wherein the lip portion includes two opposing lips extending from the tapered portion.

4. The nozzle valve as recited in claim 1, wherein the tapered portion includes a third protrusion extending from a second inner surface opposite the tapered inner surface.

5. The nozzle valve as recited in claim 4, wherein the tapered portion includes fourth protrusion extending from a second outer surface opposite the tapered outer surface.

6. The nozzle valve as recited in claim 1, wherein the nozzle valve is a monolithic injection molded component.

7. The nozzle valve as recited in claim 1, wherein the tapered portion is free of metal weights.

8. A particle separator nozzle valve, comprising:
   a connection portion substantially square in cross section and including at least four segments, each segment providing a tapered inner connection portion surface;
   a tapered portion extending from the connection portion, wherein the tapered portion includes a tapered inner surface and a tapered outer surface, and a first protrusion extends from the tapered inner surface of the tapered portion and a second protrusion extends from the tapered outer surface of the tapered portion; and
   a lip portion extending from the tapered portion, wherein a portion of the tapered outer surface is provided between the second protrusion and the lip portion.

9. The nozzle valve as recited in claim 8, wherein the nozzle valve is a monolithic injection molded component.

10. The nozzle valve as recited in claim 8, wherein each of the at least four segments provides a gap between an adjacent of the at least four segments.

11. The nozzle valve as recited in claim 8, wherein the lip portion includes two opposing lips extending from the tapered portion.

12. The nozzle valve as recited in claim 8, wherein the tapered portion includes a third protrusion extending from a second inner surface opposite the tapered inner surface.

13. The nozzle valve as recited in claim 12, wherein the tapered portion includes fourth protrusion extending from a second outer surface opposite the tapered outer surface.

14. The nozzle valve as recited in claim 8, wherein one of the at least four segments is provided at each corner of the substantially square cross section.

15. A particle separator nozzle valve, comprising:
   a connection portion including at least four corner portions, each of the at least four corner portions providing a sloped inner connection portion surface;
   a tapered portion extending from the connection portion, wherein the tapered portion includes a sloped inner surface and a sloped outer surface, and a first protrusion extends from the sloped inner surface of the tapered portion and a second protrusion extends from the sloped outer surface of the tapered portion; and
   a lip portion extending from the tapered portion.

16. The nozzle valve as recited in claim 15, wherein each of the sloped inner connection portion surfaces and the sloped inner surface of the tapered portion has a positive slope when the nozzle valve is oriented such that the connection portion faces upward and the lip portion faces downward.

17. The nozzle valve as recited in claim 15, wherein the connection portion is substantially rectangular in cross section, and one of the at least four corner portions is provided at each corner of the substantially rectangular cross section.

18. The nozzle valve as recited in claim 15, wherein a gap is provided between adjacent ones of the at least four corner portions.

19. The nozzle valve as recited in claim 15, wherein the tapered portion is free of metal weights.

20. The nozzle valve as recited in claim 15, wherein each of the sloped inner connection portion surfaces and the sloped inner surface of the tapered portion has a positive slope when the nozzle valve is oriented such that the connection portion faces upward and the lip portion faces downward, the connection portion is substantially square in cross section, and one of the at least four corner portions is provided at each corner of the substantially rectangular cross section, and the lip portion includes two opposing lips.

* * * * *